US009246366B2

(12) United States Patent
Imazawa et al.

(10) Patent No.: US 9,246,366 B2
(45) Date of Patent: Jan. 26, 2016

(54) AUTOMOTIVE ROTARY ELECTRIC MACHINE AND WINDING ASSEMBLY MANUFACTURING METHOD THAT IS USED THEREFOR

(75) Inventors: Yoshiro Imazawa, Tokyo (JP); Kazunori Tanaka, Tokyo (JP); Kazuya Hasegawa, Tokyo (JP); Norihiro Murata, Tokyo (JP); Hiroshi Hosokawa, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 452 days.

(21) Appl. No.: 13/988,472

(22) PCT Filed: Dec. 24, 2010

(86) PCT No.: PCT/JP2010/073392
§ 371 (c)(1),
(2), (4) Date: May 20, 2013

(87) PCT Pub. No.: WO2012/086067
PCT Pub. Date: Jun. 28, 2012

(65) Prior Publication Data
US 2013/0241369 A1    Sep. 19, 2013

(51) Int. Cl.
*H02K 3/28* (2006.01)
*H02K 3/00* (2006.01)
*H02K 3/12* (2006.01)
*H02K 11/04* (2006.01)
*H02K 15/08* (2006.01)
*H02K 15/02* (2006.01)
*H02K 15/06* (2006.01)

(52) U.S. Cl.
CPC .. *H02K 3/00* (2013.01); *H02K 3/12* (2013.01); *H02K 3/28* (2013.01); *H02K 11/04* (2013.01); *H02K 15/024* (2013.01); *H02K 15/063* (2013.01); *H02K 15/08* (2013.01); *Y10T 29/49071* (2015.01)

(58) Field of Classification Search
None
See application file for complete search history.

(56) References Cited

U.S. PATENT DOCUMENTS

| 6,396,185 | B1 * | 5/2002 | Asao | H02K 1/16 310/179 |
| 6,455,972 | B1 * | 9/2002 | Asao | H02K 3/12 310/184 |
| 6,552,463 | B2 * | 4/2003 | Oohashi | H02K 3/12 310/184 |
| 2006/0230603 | A1 | 10/2006 | Hirota et al. | |
| 2009/0267440 | A1 | 10/2009 | Kometani et al. | |
| 2010/0148621 | A1 * | 6/2010 | Ishizuka | H02K 3/12 310/201 |
| 2012/0112595 | A1 * | 5/2012 | Watanabe | H02K 3/12 310/207 |

FOREIGN PATENT DOCUMENTS

| JP | 05-227688 A | 9/1993 |
| WO | 2005/074105 A1 | 8/2005 |
| WO | 2007/088598 A1 | 8/2007 |

* cited by examiner

Primary Examiner — Tran Nguyen
(74) Attorney, Agent, or Firm — Sughrue Mion, PLLC; Richard C. Turner

(57) ABSTRACT

A winding assembly includes: slot-housed portions housed inside each of the slots of the stator core so as to form pairs that line up in an inner layer and an outer layer relative to a slot depth direction; first return portions at a first axial end of the stator core that link end portions of the slot-housed portions housed in the inner layer inside each of the slots and end portions of the slot-housed portions housed in the outer layer inside the slots that are (N−M) slots away; and second return portions at a second axial end of the stator core that link end portions of the slot-housed portions housed in the outer layer inside each of the slots and end portions of the slot-housed portions housed in the inner layer inside the slots that are (N+M) slots away.

6 Claims, 13 Drawing Sheets

Comparative Example

US 9,246,366 B2

AUTOMOTIVE ROTARY ELECTRIC MACHINE AND WINDING ASSEMBLY MANUFACTURING METHOD THAT IS USED THEREFOR

CROSS REFERENCE TO RELATED APPLICATIONS

This application is a National Stage International Application No. PCT/JP2010/073392 filed Dec. 24, 2010, the content of which are incorporated herein by reference in their entirety.

TECHNICAL FIELD

The present invention relates to a rotary electric machine such as an automotive alternator, for example, and a winding assembly manufacturing method that is used therefor, and particularly relates to a winding construction of a stator winding.

BACKGROUND ART

In conventional automotive alternators, stator windings are configured by wye-connecting three phase windings that have a phase difference of 120 electrical degrees (see Patent Literature 1, for example).

However, because the stator windings are configured by wye-connecting the three phase windings that have a phase difference of 120 electrical degrees, a line voltage that is only √3 times a single phase induced voltage is generated, and one problem has been that electric power generating requirements cannot be met at low rotational speeds.

In order to solve this, it has been proposed that each of the phase windings be configured by connecting in series two windings that have a phase difference of 120 electrical degrees, also called a "zigzag connection" (see Patent Literature 2, for example).

According to Patent Literature 2, it is claimed that electric power generating requirements can be met at low rotational speeds because a line voltage that is twice the single phase induced voltage is generated by configuring each of the phase windings using the zigzag connection, increasing no-load electromotive forces increase, and enabling power generation start-up speed to be lowered.

However, in Patent Literature 2, because it is necessary to connect together end portions of two windings that are mounted into different slot groups, one problem has been that connection points are increased.

Now, conventionally, winding constructions have been proposed in which windings that are electrically equivalent to zigzag connections can be configured using single conductor wires (see Patent Literature 3, for example). According to Patent Literature 3, because windings that are electrically equivalent to zigzag connections can be configured using single conductor wires by disposing the single conductor wires such that short-pitch windings and the long-pitch windings alternate, increases in the number of connection points can be suppressed.

CITATION LIST

Patent Literature

Patent Literature 1: Japanese Patent Laid-Open No. HEI 04-26345 (Gazette)
Patent Literature 2: Japanese Patent Laid-Open No. 2001-327137 (Gazette)
Patent Literature 3: Japanese Patent Laid-Open No. HEI 05-227688 (Gazette)

SUMMARY OF THE INVENTION

Problem to be Solved by the Invention

In Patent Literature 3, a specific method for mounting the conductor wires is not described, but it can be inferred, for example, that conductor wires are mounted into an annular stator core individually so as to alternately enter slots that are five slots apart and slots that are seven slots apart.

However, in recent years, as engine compartments become smaller, additional improvements in output are being sought due to increases in vehicle load, and it has been necessary to increase the cross-sectional area of the conductor wires to achieve reductions in the resistance of the windings. Because conductor wires become harder to bend as they become thicker, mounting thick conductor wires into the annular stator core individually so as to alternately enter slots that are five slots apart and slots that are seven slots apart is not suitable for mass production.

The present invention aims to solve the above problems and an object of the present invention is to provide an automotive rotary electric machine and a winding assembly manufacturing method that is used therefor that can simplify complicated connecting operations by mounting into a stator core a winding assembly that is produced by bending and shaping a predetermined number of conductor wires so as to enable windings that are electrically equivalent to zigzag connections to be configured using single conductor wires.

Means for Solving the Problem

In order to achieve the above object, according to one aspect of the present invention, there is provided an automotive rotary electric machine including: a metal housing that includes a front bracket and a rear bracket; a rotor that is rotatably disposed inside the housing by being fixed to a shaft that is rotatably supported by the front bracket and the rear bracket; and a stator including: an annular stator core in which a plurality of slots that have an opening on an inner circumferential side are disposed at a predetermined pitch circumferentially, and that is disposed so as to surround the rotor so as to be held between the front bracket and the rear bracket; and a stator winding that is mounted into the stator core. The stator winding is constituted by a plurality of wave windings that have a slot pitch that alternates between a slot pitch of (N−M) and a slot pitch of (N+M), where N is an integer that is greater than or equal to 2, and M is an integer that is greater than or equal to 1 and less than N, and the plurality of wave windings are constituted by at least one winding assembly that is mounted into the stator core. The winding assembly is produced by winding wires that are constituted by 2N continuous wires, and includes: slot-housed portions that are housed inside each of the slots of the stator core so as to form pairs that line up in an inner layer and an outer layer relative to a slot depth direction; first return portions at a first axial end of the stator core that link end portions of the slot-housed portions that are housed in a first of the inner layer and the outer layer inside each of the slots and end portions of the slot-housed portions that are housed in a second of the inner layer and the outer layer inside the slots that are (N−M) slots away; and second return portions at a second axial end of the stator core that link end portions of the slot-housed portions that are housed in the second of the inner layer and the outer layer inside each of the slots and end portions of the slot-housed portions that are housed in the first of the inner layer and the outer layer inside the slots that are (N+M) slots away, two ends of the (N−M) wires projecting at the first axial end of the stator core, and two ends of the (N+M) wires projecting at the second axial end of the stator core.

Effects of the Invention

According to the present invention, because a winding assembly that is produced by winding 2N wires in advance is mounted into the stator core, increases in cross-sectional area of the wires are enabled, enabling demands for improvement in output to be met.

Because the winding assembly is configured such that windings that are electrically equivalent to zigzag connections can be configured using single conductor wires, complicated connecting operations can be simplified.

BEST MODE FOR CARRYING OUT THE INVENTION

Preferred embodiments of an automotive rotary electric machine according to the present invention will now be explained with reference to the drawings.
Embodiment 1

Figure 1:
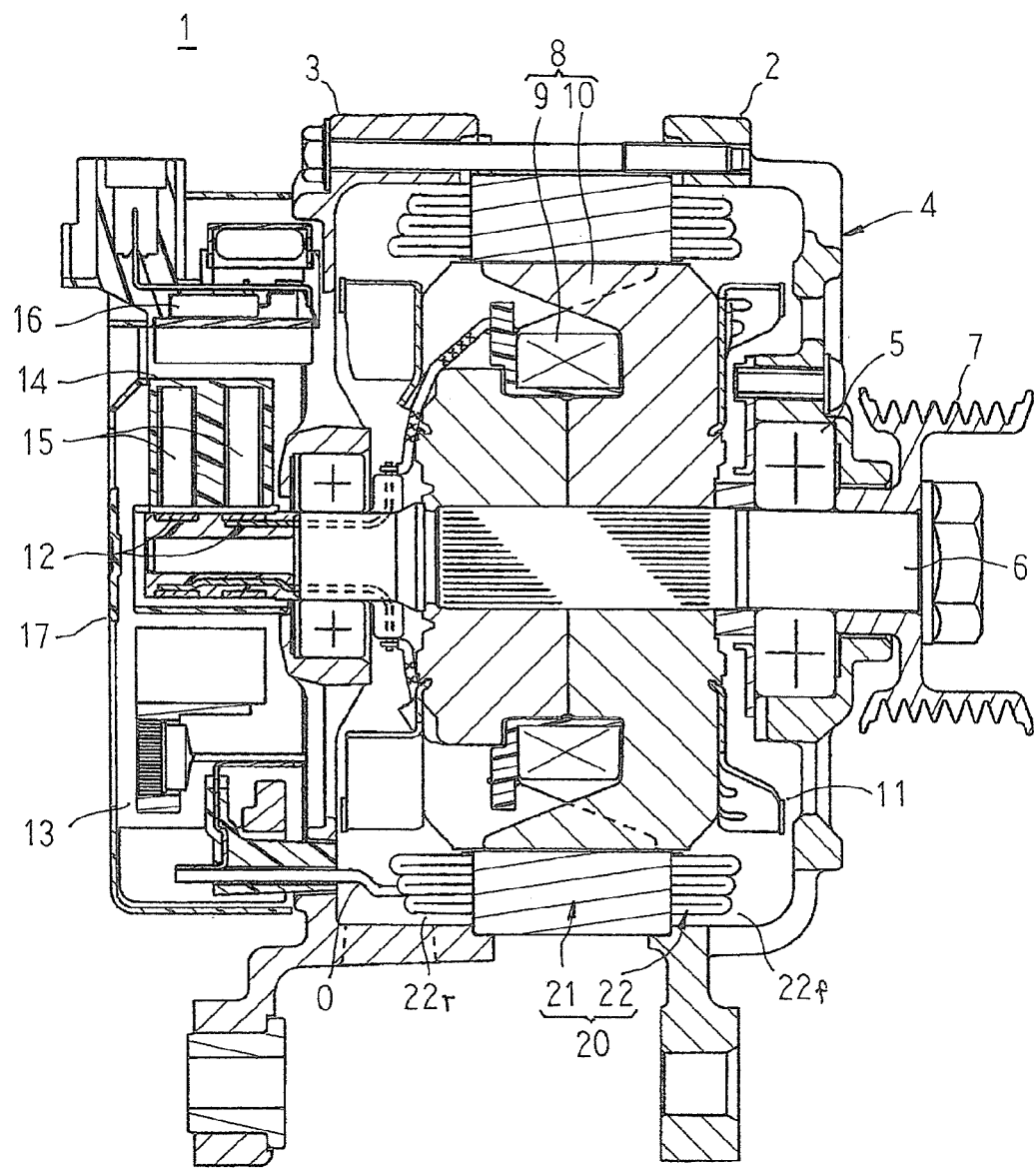
FIG. 1 is a cross section that explains a configuration of an automotive alternator according to Embodiment 1 of the present invention.
Figure 2:
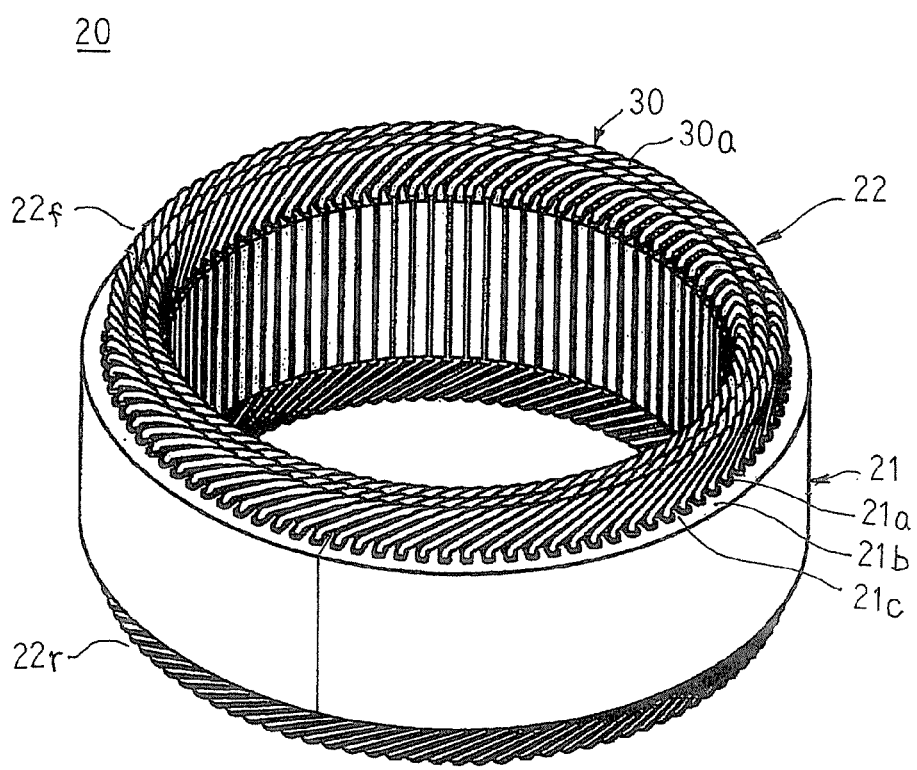
FIG. 2 is a perspective that shows a stator of the automotive alternator according to Embodiment 1 of the present invention.
Figure 3:
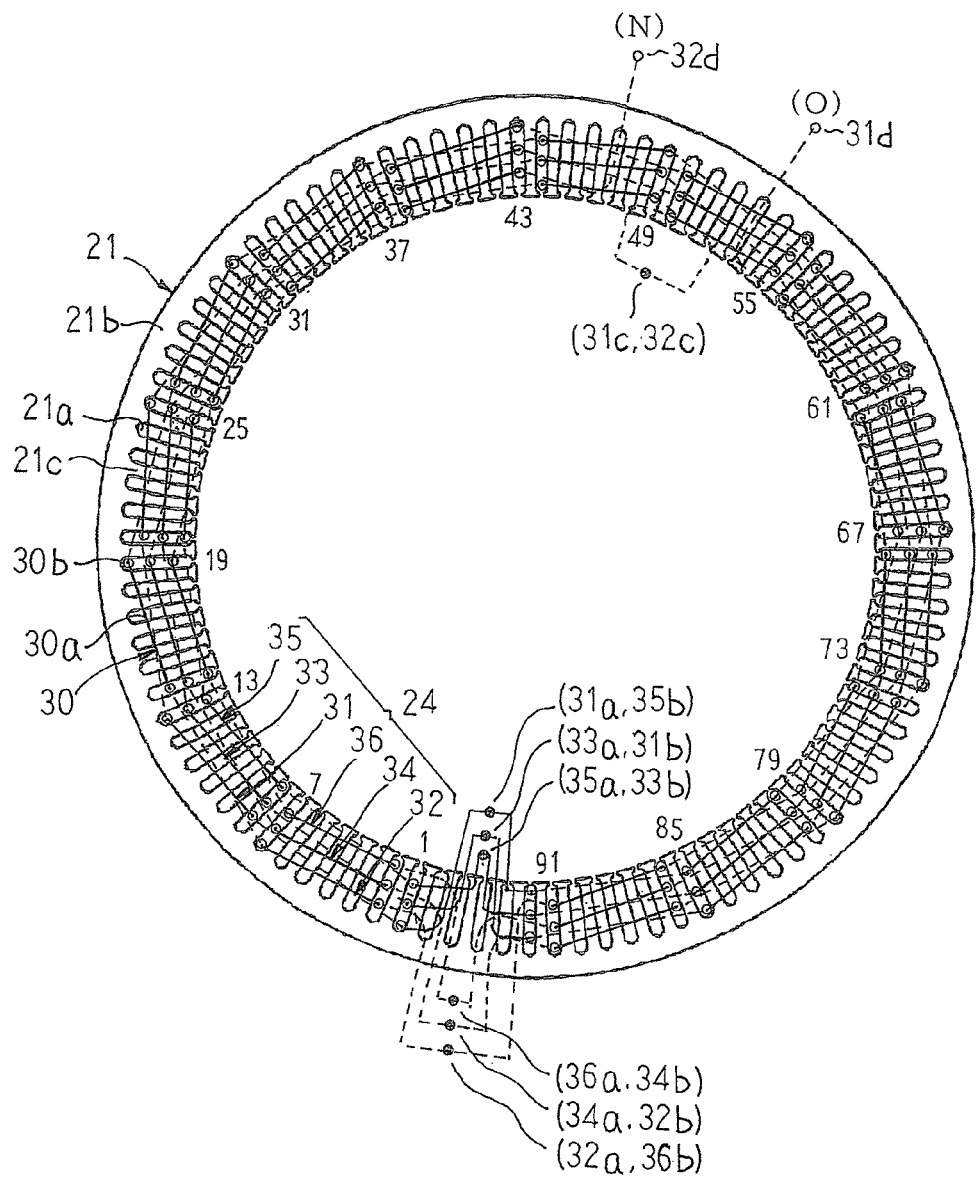
FIG. 3 is a rear-end end elevation that explains a connected state of a single phase portion of a stator winding in the automotive alternator according to Embodiment 1 of the present invention.
Figure 4:
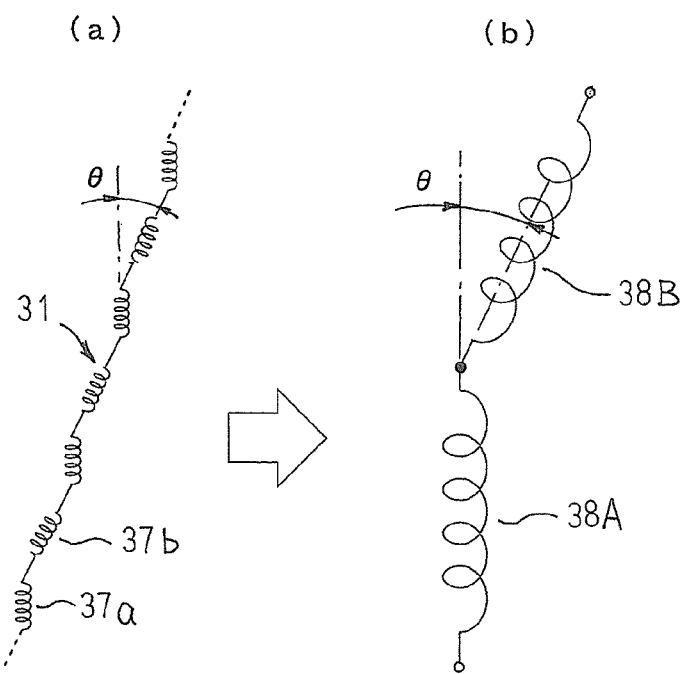
FIG. 4 is a diagram that explains a configuration of a phase winding in the automotive alternator according to Embodiment 1 of the present invention.
Figure 5:
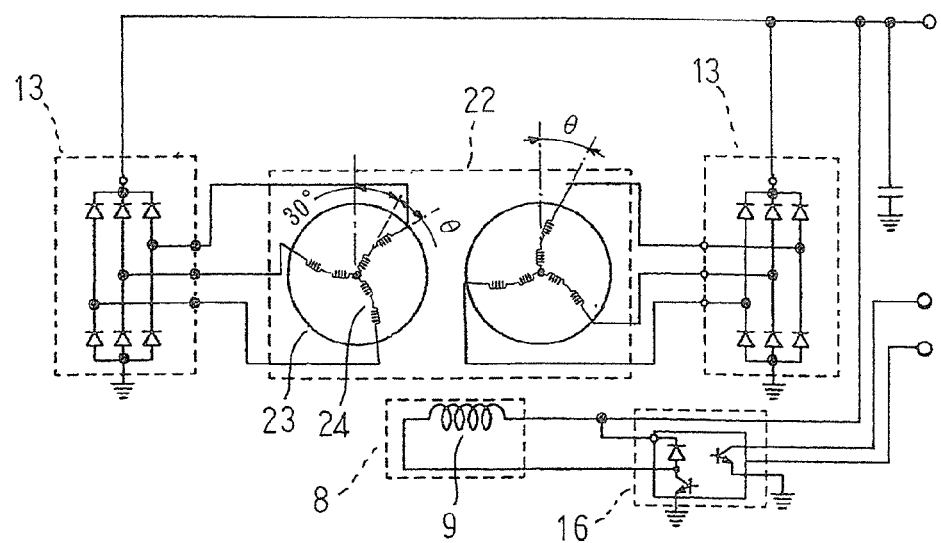
FIG. 5 is a circuit configuration diagram for the automotive alternator according to Embodiment 1 of the present invention.

FIG. 1 is a cross section that explains a configuration of an automotive alternator according to Embodiment 1 of the present invention, FIG. 2 is a perspective that shows a stator of the automotive alternator according to Embodiment 1 of the present invention, FIG. 3 is a rear-end end elevation that explains a connected state of a single phase portion of a stator winding in the automotive alternator according to Embodiment 1 of the present invention, FIG. 4 is a diagram that explain a configuration of a phase winding in the automotive alternator according to Embodiment 1 of the present invention, and FIG. 5 is a circuit configuration diagram for the automotive alternator according to Embodiment 1 of the present invention. Moreover, output wires are omitted in FIG. 2. In FIG. 3, solid lines represent front-end wiring, and broken lines represent rear-end wiring.

In FIG. 1, an automotive alternator 1 that functions as an automotive rotary electric machine includes: a housing 4 that is constituted by a front bracket 2 and a rear bracket 3 that are each approximately bowl-shaped and made of aluminum; a shaft 6 that is rotatably supported in the housing 4 by means of a pair of bearings 5; a pulley 7 that is fixed to an end portion of the shaft 6 that projects out frontward from the housing 4; a rotor 8 that is fixed to the shaft 6 and that is disposed inside the housing 4; a stator 20 that is fixed to the housing 4 so as to surround the rotor 8; a pair of slip rings 12 that are fixed to a portion of the shaft 6 that projects out rearward from the housing 4, and that supply electric current to the rotor 8; rectifying apparatuses 13 that are produced so as to have an approximate C shape, that are disposed outside the slip rings 12 in a fan shape that is centered around the shaft 6 in a plane that is perpendicular to the shaft 6, and that rectify alternating-current voltages that are generated in the stator 20 into direct-current voltages; a pair of brushes 15 that are housed inside a brush holder 14 that is disposed outside the pair of slip rings 12 between tip ends of the approximate C shape of the rectifying apparatuses 13 so as to slide on the respective slip rings 12; a voltage regulator 16 that is mounted to the brush holder 14 and that adjusts magnitude of the alternating-current voltages that are generated in the stator 20; and a resin protective cover 17 that is mounted to the rear bracket 3 so as to cover the rectifying apparatuses 13, the brush holder 14, and the voltage regulator 16.

The rotor 8 is a Lundell rotor, and includes: a field winding 9 that generates magnetic flux on passage of an excitation current; and a pole core 10 that is disposed so as to cover the field winding 9, and in which magnetic poles are formed by the magnetic flux. Fans 11 are fixed to two axial end surfaces of the pole core 10 by welding, etc.

As shown in FIG. 2, the stator 20 includes: a cylindrical stator core 21 in which slots 21a that have openings on an inner circumferential side are arranged at a predetermined pitch in a circumferential direction; and a stator winding 22 that is mounted into the stator core 21, and in which alternating currents arise due to changes in magnetic flux from the field winding 9 as the rotor 8 rotates. As described below, the stator winding 22 includes a plurality of windings in which single wires 30 are wave wound and mounted so as to be turned over outside the slots 21a near end surfaces of the stator core 21, and alternately occupy an inner layer and an outer layer in a slot depth direction inside slots 21a that alternate between slots 21a that are five slots apart and slots 21a that are seven slots apart.

In this case, ninety-six slots 21a are formed on the stator core 21 at a uniform angular pitch (a pitch of 30 electrical degrees) so as to correspond to the number of magnetic poles (16) in the rotor 8 and house two three-phase alternating current windings. In other words, the slots 21a are formed at a ratio of two slots per phase per pole. Although not shown, insulators 25 are mounted into each of the slots 21a to insulate the stator winding 22 and the stator core 21 electrically.

The stator 20 that is configured in this manner is disposed such that two axial end surfaces of the stator core 21 are held between the front bracket 2 and the rear bracket 3 from two axial ends, and so as to surround the pole core 10 of the rotor 8 so as to ensure a uniform gap from the outer peripheral surface of the pole core 10.

Next, a winding construction of a single phase portion of the phase windings 24 will be explained in detail with reference to FIG. 3.

The stator core 21 is formed by laminating magnetic steel sheets that are formed so as to have predetermined shapes, has: an annular core back 21b; and teeth 21c that each project radially inward from an inner circumferential surface of the core back 21b, and that are arranged at a uniform angular pitch circumferentially, and the slots 21a, which have openings on an inner circumferential side, are defined by the core back 21b and circumferentially adjacent teeth 21c.

The phase winding 24 is constituted by first through sixth windings 31 through 36 that are each constituted by a single wire 30. The wires 30 are constituted by continuous wires that are made of copper that have a circular cross section that is coated with an insulator, for example.

The first winding 31 is configured by winding a single wire 30 into a wave winding from Slot Numbers 1 through 92 so as to alternately occupy a first position from an outer circumferential side (hereinafter "Address 1") and a second position from the outer circumferential side (hereinafter "Address 2") inside the slots 21a in order of slots 21a that are seven slots apart and slots 21a that are five slots apart. The second winding 32 is configured by winding a wire 30 into a wave winding from Slot Numbers 2 through 91 so as to alternately occupy Address 2 and Address 1 inside the slots 21a in order of slots 21a that are five slots apart and slots 21a that are seven slots apart. The third winding 33 is configured by winding a single wire 30 into a wave winding from Slot Numbers 1 through 92 so as to alternately occupy a third position from the outer circumferential side (hereinafter "Address 3") and a fourth position from the outer circumferential side (hereinafter "Address 4") inside the slots 21a in order of slots 21a that are seven slots apart and slots 21a that are five slots apart. The fourth winding 34 is configured by winding a wire 30 into a wave winding from Slot Numbers 2 through 91 so as to alternately occupy Address 4 and Address 3 inside the slots 21a in order of slots 21a that are five slots apart and slots 21a that are seven slots apart. The fifth winding 35 is configured by winding a single wire 30 into a wave winding from Slot Numbers 1 through 92 so as to alternately occupy a fifth position from the outer circumferential side (hereinafter "Address 5") and a sixth position from the outer circumferential side (hereinafter "Address 6") inside the slots 21a in order of slots 21a that are seven slots apart and slots 21a that are five slots apart. The sixth winding 36 is configured by winding a wire 30 into a wave winding from Slot Numbers 2 through 91 so as to alternately occupy Address 6 and Address 5 inside the slots 21a in order of slots 21a that are five slots apart and slots 21a that are seven slots apart.

At a first end (a front end) of the stator core 21, an end portion 31a of the first winding 31 that projects outward from Slot Number 1 and an end portion 35b of the fifth winding 35 that projects outward from Slot Number 92 are joined together, an end portion 33a of the third winding 33 that projects outward from Slot Number 1 and an end portion 31b of the first winding 31 that projects outward from Slot Number 92 are joined together, and an end portion 35a of the fifth winding 35 that projects outward from Slot Number 1 and an end portion 33b of the third winding 33 that projects outward from Slot Number 92 are joined together to form a three-turn winding.

At a second end (a rear end) of the stator core 21, an end portion 32a of the second winding 32 that projects outward from Slot Number 2 and an end portion 36b of the sixth winding 36 that projects outward from Slot Number 91 are joined together, an end portion 34a of the fourth winding 34 that projects outward from Slot Number 2 and an end portion 32b of the second winding 32 that projects outward from Slot Number 91 are joined together, and an end portion 36a of the sixth winding 36 that projects outward from Slot Number 2 and an end portion 34b of the fourth winding 34 that projects outward from Slot Number 91 are joined together to form a three-turn winding.

In addition, a portion of the wire 30 of the second winding 32 that projects outward at the second end of the stator core 21 from Slot Numbers 43 and 50 is cut, and a portion of the wire 30 of the first winding 31 that projects outward at the second end of the stator core 21 from Slot Numbers 49 and 56 is cut. A cut end 31c of the first winding 31 and a cut end 32c of the second winding 32 are then joined together to form a six-turn phase winding 24 that is formed by connecting the first through sixth windings 31 through 36 in series. A cut end 31d of the first winding 31 and a cut end 32d of the second winding 32 respectively form an output wire (O) and a neutral point (N).

Here, the first winding 31 is configured by winding a wire 30 so as to be housed alternately in slots 21a that are seven slots apart and slots 21a that are five slots apart in Slot Numbers 1 through 92. Thus, as shown in FIG. 4(a), the first winding 31 is configured by linking winding portions 37a and 37b that have a phase difference of θ electrical degrees in a zigzag. As shown in FIG. 4(b), a first winding 31 that is configured in this manner is electrically equivalent to a zigzag-connected winding in which a winding 38A that is configured by winding a wire 30 so as to be housed in every seventh slot 21a and a winding 38B that is configured by winding a wire 30 so as to be housed in every fifth slot 21a are connected in series. In other words, the first winding 31 is electrically equivalent to a zigzag-connected winding in which two windings 38A and 38B that have a phase difference of θ electrical degrees (=30 degrees) are connected in series. Moreover, the second through sixth windings 32 through 36 are also electrically equivalent to zigzag-connected windings in which two windings 38A and 38B that have a phase difference of 30 electrical degrees are connected in series, in a similar manner to that of the first winding 31.

Six phase windings 24 are formed by offsetting slots 21a into which the wires 30 are mounted in a similar or identical manner one at a time. As shown in FIG. 5, two three-phase alternating current windings 23 are each configured by wye-connecting three phase windings 24. Output wires O that are constituted by end portions of the wye-connected phase winding 24 are led out from a rear-end coil end group 22r and connected to terminals of the rectifying apparatuses 13. The respective three-phase alternating-current windings 23 are thereby connected to the respective rectifying apparatuses 13 to connect in parallel and combine direct-current (DC) output from the respective rectifying apparatuses 13.

Return portions 30a of the wires 30 that project outward from the slots 21a near the end surfaces of the stator core 21 and are turned over form coil ends. The return portions 30a are separated from each other in a circumferential direction, and are arranged neatly circumferentially so as to form three rows in a radial direction to form front-end and rear-end coil end groups 22f and 22r at two ends of the stator core 21. Heights from the end surfaces of the stator core 21 to top portions of return portions 30a that function as second return portions that link together slot-housed portions 30b that are housed inside the slots 21a that are seven slots apart are higher than heights from the end surfaces of the stator core 21 to top portions of return portions 30a that function as first return portions that link together slot-housed portions 30b that are housed inside the slots 21a that are five slots apart. As shown in FIG. 1, the rear-end coil end group 22r is constituted by the return portions 30a that link together the slot-housed portions 30b that are housed inside the slots 21a that are seven slots apart.

The respective wires 30 that constitute the first, third, and fifth windings 31, 33, and 35 are wound into wave windings so as to extend outward at end surfaces of the stator core 21 from one slot 21a and be turned over and alternately enter slots 21a that are seven slots apart and slots 21a that are five slots apart. The respective wires 30 are wound so as to alternately occupy an inner layer and an outer layer in a slot depth direction (a radial direction) in every slot that alternates between the slots 21a that are seven slots apart and the slots 21a that are five slots apart.

The second, fourth, and sixth windings 32, 34, and 36 are wound into wave windings so as to extend outward at end surfaces of the stator core 21 from one slot 21a and be turned over and alternately enter slots 21a that are five slots apart and slots 21a that are seven slots apart. The respective wires 30 are wound so as to alternately occupy an inner layer and an outer layer in a slot depth direction (a radial direction) in every slot that alternates between the slots 21a that are five slots apart and the slots 21a that are seven slots apart.

Here, the stator winding 22 is equivalent to three pairs of first winding groups and second winding groups being arranged so as to line up in a radial direction, the first winding groups being configured by arranging six first windings 31 at a pitch of one slot, and the second winding groups being configured by arranging six second windings 32 at a pitch of one slot. These pairs of first winding groups and second winding groups are provided by a winding assembly 40 that is produced while forming twelve wires 30 into a wave shapes.

Next, construction of the winding assembly 40 will be explained.

Figure 6:
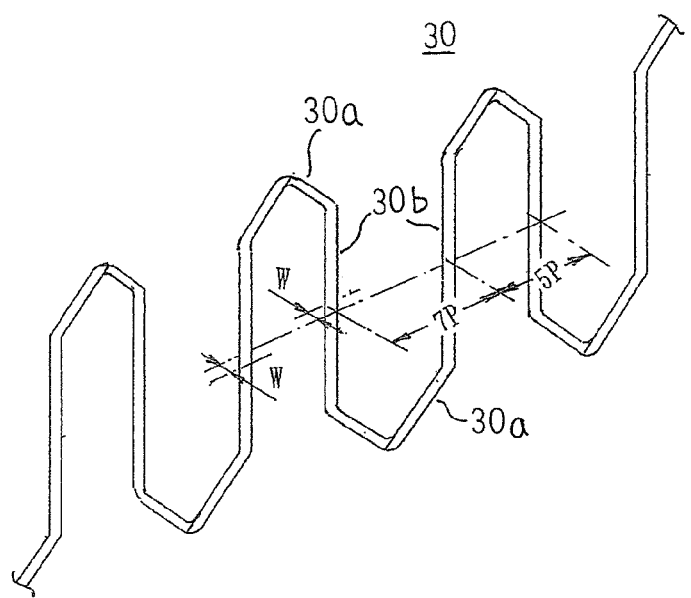
FIG. 6 is a perspective that shows a wire that constitutes a winding assembly that is used in the automotive alternator according to Embodiment 1 of the present invention.
Figure 7:
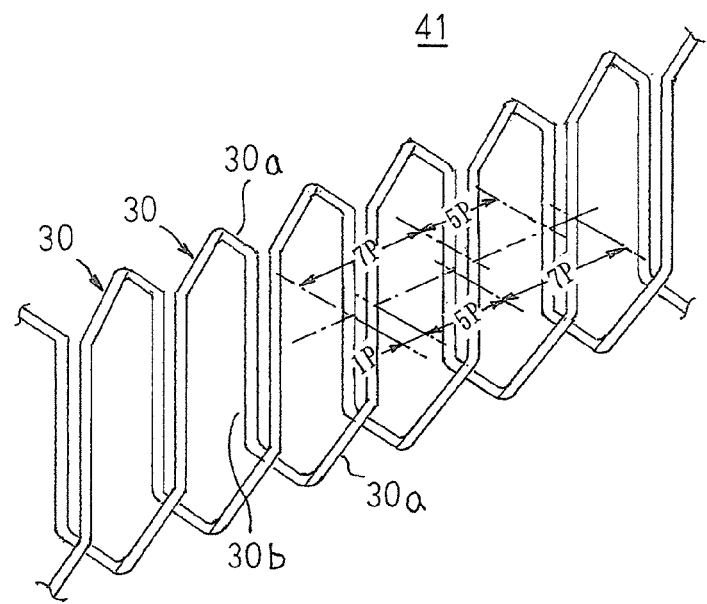
FIG. 7 is a perspective that shows a wire pair that constitutes a winding assembly that is used in the automotive alternator according to Embodiment 1 of the present invention.
Figure 8:
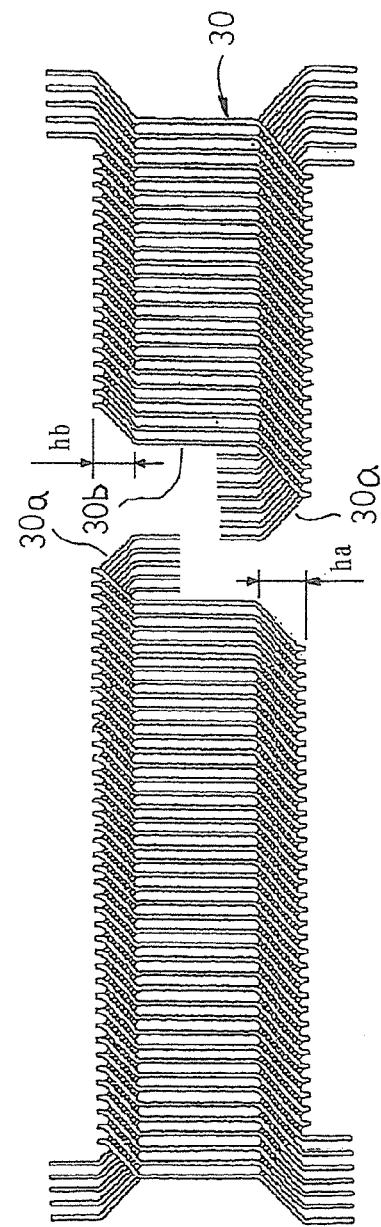
FIG. 8 is a plan that shows a winding assembly that constitutes the stator winding that is used in the automotive alternator according to Embodiment 1 of the present invention.

FIG. 6 is a perspective that shows a wire that constitutes a winding assembly that is used in the automotive alternator according to Embodiment 1 of the present invention, FIG. 7 is a perspective that shows a wire pair that constitutes a winding assembly that is used in the automotive alternator according to Embodiment 1 of the present invention, and FIG. 8 is a plan that shows a winding assembly that constitutes the stator winding that is used in the automotive alternator according to Embodiment 1 of the present invention.

As shown in FIG. 6, the wires 30 are formed by bending into planar patterns in which slot-housed portions 30b that are linked by return portions 30a are arranged at a pitch that alternates between a pitch of seven slots (7P) and a pitch of five slots (5P). Adjacent slot-housed portions 30b are alternately offset by the return portions 30a by a predetermined amount (W) in a direction (hereinafter called a "thickness direction" of the slot-housed portions 30b) that is perpendicular to a direction of arrangement of the slot-housed portions 30b and an axial direction of the slot-housed portions 30b.

As shown in FIG. 7, wires 30 that are formed into such a pattern are arranged on inverted wires 30 so as to be offset by a pitch of one slot such that the slot-housed portions 30b are stacked in the thickness direction to configure wire pairs 41. These wire pairs 41 correspond to the pairs of first and second windings 31 and 32 described above.

Six wire pairs 41 are arranged so as to be offset by a pitch of one slot to configure the winding assembly 40 that is shown in FIG. 8. Here, the direction of arrangement of the pairs of slot-housed portions 30b, the axial direction of the slot-housed portions 30b, and the thickness direction of the slot-housed portions 30b are the longitudinal direction, the width direction, and the thickness direction of the winding assembly 40.

In winding assemblies 40 that are configured in this manner, ninety-six pairs of slot-housed portions 30b that are stacked in the thickness direction are arranged at a pitch of one slot. First axial end portions of each of the slot-housed portions 30b that are positioned on a first side in the thickness direction are linked by the return portions 30a to respective first axial end portions of the slot-housed portions 30b that are positioned on a second side in the thickness direction that are separated by a pitch of five slots (5P). In addition, second axial end portions of each of the slot-housed portions 30b that are positioned on the second side in the thickness direction are linked by the return portions 30a to respective second axial end portions of the slot-housed portions 30b that are positioned on the first side in the thickness direction that are separated by a pitch of seven slots (7P).

The end portions of five wires 30 project from a first side in the width direction side at each of two longitudinal ends of the winding assembly 40, and the end portions of seven wires 30 project from a second side in the width direction at each of the two longitudinal ends of the winding assemblies 40. The return portions 30a that link the slot-housed portions 30b that are five slots apart are arranged neatly in rows on the first side in the width direction of the winding assembly 40, and the return portions 30a that link the slot-housed portions 30b that are seven slots apart are arranged neatly in rows on the second side in the width direction of the winding assembly 40. The height ha of the rear-end coil end group 22r that is constituted by the return portions 30a that link the slot-housed portions 30b that are seven slots apart is higher than the height hb of the front-end coil end group 22f that is constituted by the return portions 30a that link the slot-housed portions 30b that are five slots apart.

Next, operation of an automotive alternator 1 that has been configured in this manner will be explained.

First, electric current is supplied to the field winding 9 of the rotor 8 by means of the brushes 15 and the slip rings 12 to generate magnetic flux. North-seeking (N) poles and South-seeking (S) poles are formed alternately in a circumferential direction on outer circumferential portions of the pole core 10 by this magnetic flux.

At the same time, rotational torque from an engine (not shown) is transferred to the shaft 6 by means of a belt (not shown) and the pulley 7 to rotate the rotor 8. Thus, rotating magnetic fields are applied to the stator winding 22 in the stator 20, generating electromotive forces in the stator winding 22. These alternating-current electromotive forces are rectified into direct current by the rectifying apparatuses 13, and supplied to on-board loads, and to a battery, etc. The on-board loads are thereby driven, and the battery is charged.

According to Embodiment 1, each of the phase windings 24 is configured by winding a wire 30 so as to alternately enter slots 21a that are five slots apart and slots 21a that are seven slots apart. Thus, because each of the phase windings 24 is electrically equivalent to a zigzag-connected winding that is configured by connecting in series a short-pitch winding that is wound at a pitch of five slots and a long-pitch winding that is wound at a pitch of seven slots, large line voltages can be generated, enabling electric power generating requirements to be met at low rotational speeds. Because the first through sixth windings 31 through 36 that constitute each of the phase windings 24 are configured into windings that are electrically equivalent to a zigzag-connected winding using single wires 30, increases in the number of connection points can be suppressed, and workability can be improved.

Because winding assemblies 40 that are produced by bending and shaping twelve wires 30 are mounted to the stator core 21 to configure the stator winding 22, it is not necessary to mount the wires 30 into the stator core 21 individually. Thus, increases in cross-sectional area of the wires 30 are enabled, enabling reductions in the resistance of the stator winding 22 to meet demands for improvement in output of the automotive alternator 1.

Because the rear-end coil end group 22r of the stator 20 is constituted by return portions 30a that function as second return portions that link the end portions of the slot-housed portions 30b that are housed in the slots 21a that are seven slots apart, coil end height is increased. Thus, the lengths of the output wires O of the stator winding 22 that are connected to the rectifying apparatuses 13 that are disposed axially outside the rear bracket 3 are shortened, improving vibration resistance.

Next, a manufacturing method for the stator 20 will be explained.

Figure 9:
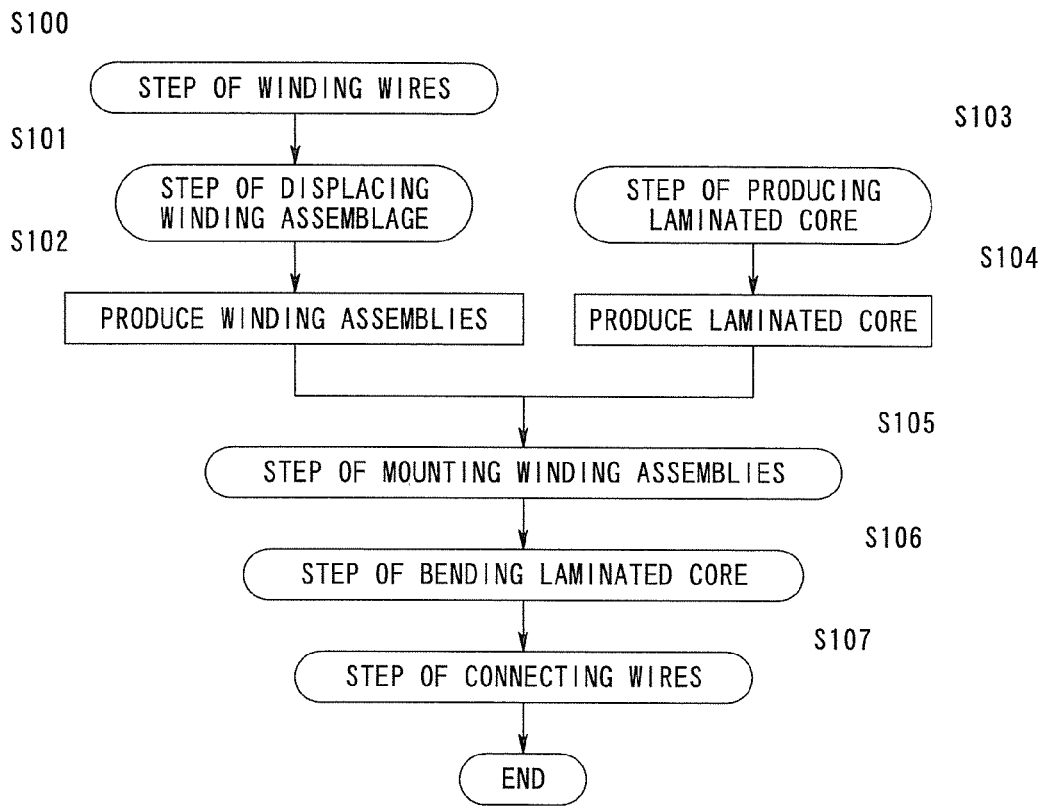
FIG. 9 is a process diagram that explains a manufacturing method for the stator that is used in the automotive alternator according to Embodiment 1 of the present invention.
Figure 10:
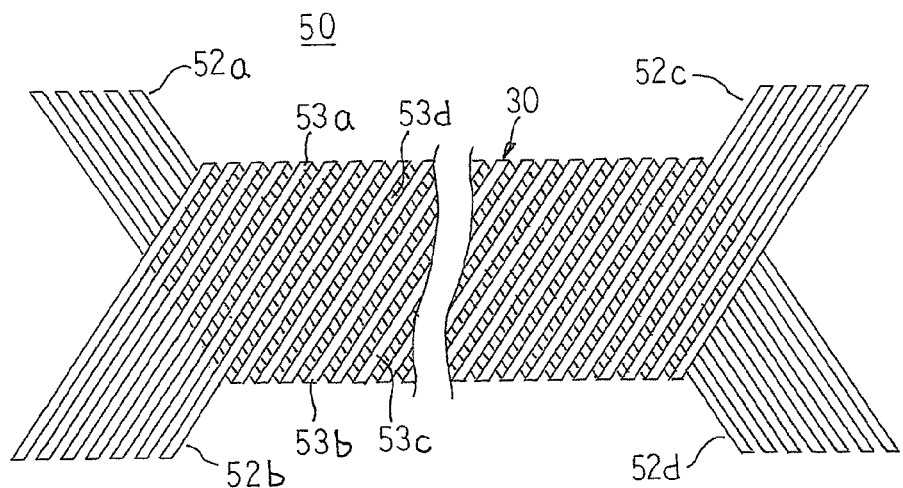
FIG. 10 is a plan that shows a winding assemblage that is produced by a step of winding wires in the manufacturing method for the stator that is used in the automotive alternator according to Embodiment 1 of the present invention.
Figure 11:
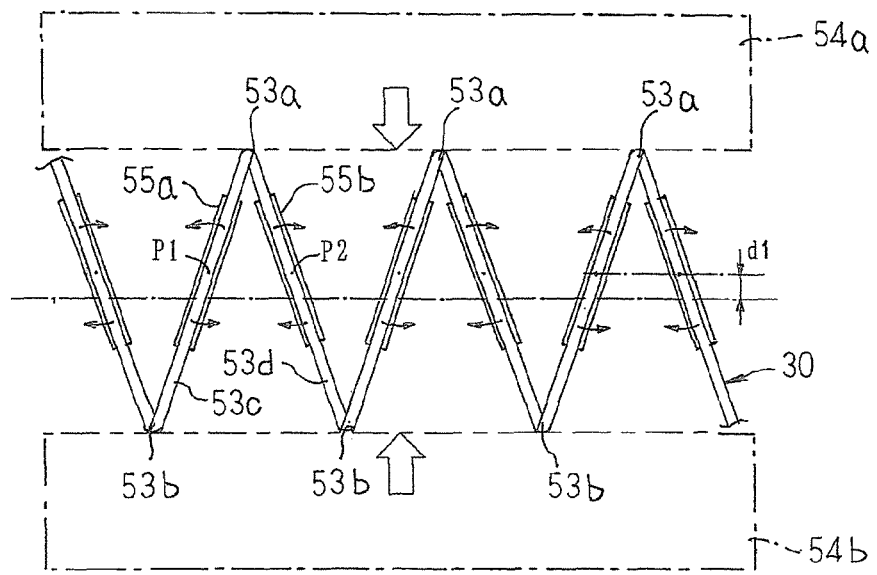
FIG. 11 is a diagram that explains a step of displacing the winding assemblage in the manufacturing method for the stator that is used in the automotive alternator according to Embodiment 1 of the present invention.
Figure 12:
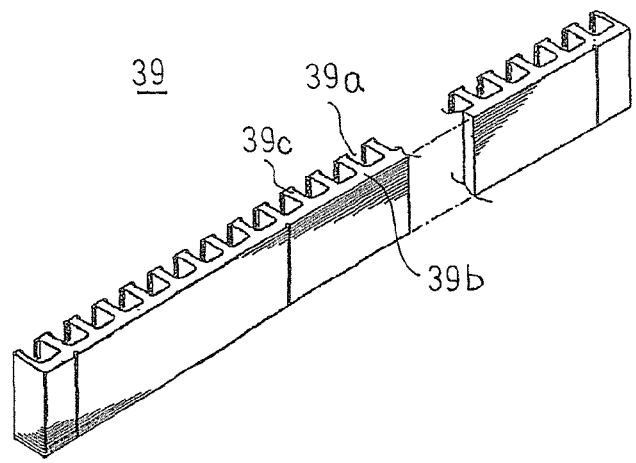
FIG. 12 is a perspective that shows a laminated core in the manufacturing method for the stator that is used in the automotive alternator according to Embodiment 1 of the present invention.
Figure 13:
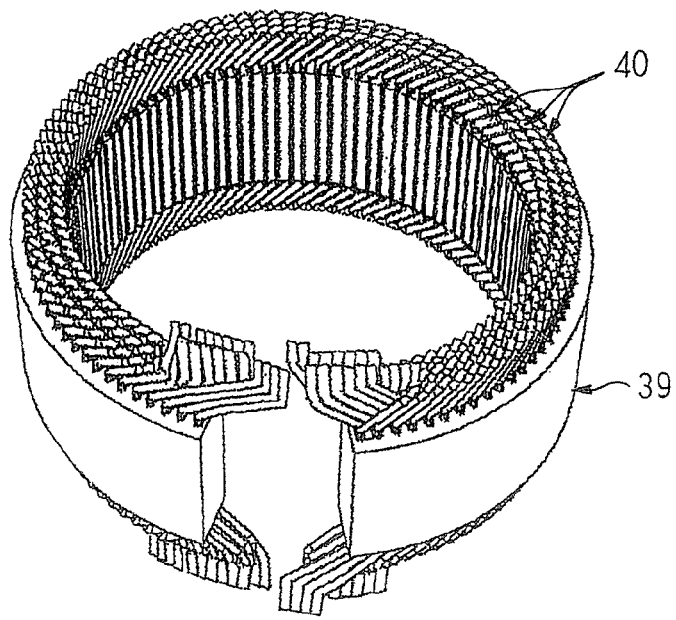
FIG. 13 is a perspective that explains a step of bending the laminated core in the manufacturing method for the stator that is used in the automotive alternator according to Embodiment 1 of the present invention.

FIG. 9 is a process diagram that explains a manufacturing method for the stator that is used in the automotive alternator according to Embodiment 1 of the present invention, FIG. 10 is a plan that shows a winding assemblage that is produced by a step of winding wires in the manufacturing method for the stator that is used in the automotive alternator according to Embodiment 1 of the present invention, FIG. 11 is a diagram that explains a step of displacing the winding assemblage in the manufacturing method for the stator that is used in the automotive alternator according to Embodiment 1 of the present invention, FIG. 12 is a perspective that shows a laminated core in the manufacturing method for the stator that is used in the automotive alternator according to Embodiment 1 of the present invention, and FIG. 13 is a perspective that explains a step of bending the laminated core in the manufacturing method for the stator that is used in the automotive alternator according to Embodiment 1 of the present invention.

A stator manufacturing method will now be explained based on the process diagram that is shown in FIG. 9.

First, a winding assemblage 50 that is shown in FIG. 10 is produced by a wire winding step S100 that is explained in FIGS. 23 and 25 of International Publication No. WO/2005/074105 (Pamphlet), for example. This winding assemblage 50 is produced by forming outlet end portions 52a and 52b on twelve wires 30, winding the twelve wires 30 repeatedly a plurality of times simultaneously, and subsequently forming outlet end portions 52c and 52d. Moreover, the outlet end portions 52a and 52c are the end portions of five wires 30, and the outlet end portions 52b and 52d are the end portions of seven wires 30.

As shown in FIGS. 10 and 11, each of the wires 30 of the winding assemblage 50 has a plurality of first bent portions 53a, a plurality of second bent portions 53b, a plurality of first rectilinear portions 53c, and a plurality of second rectilinear portions 53d. In FIG. 11, the first bent portions 53a and the second bent portions 53b are distributed top and bottom, and are arranged at a uniform pitch so as to be offset by a half pitch from each other. The first rectilinear portions 53c extend obliquely from the second bent portions 53b toward the first bent portions 53a and link them, and the second rectilinear portions 53d extend obliquely from the first bent portions 53a toward the second bent portions 53b and link them. The wires 30 are wound so as to repeat unit loops that pass from the second bent portions 53b through the first rectilinear portions 53c to the first bent portions 53a, and then pass from the first bent portions 53a through the second rectilinear portions 53d to the second bent portions 53b. Moreover, in FIG. 11, only a single wire 30 is shown, but in fact, twelve wires 30 that have similar shapes are wound parallel to each other, as shown in FIG. 10.

Next, a step of displacing the winding assemblage 50 will be explained.

As shown in FIG. 11, in the step S101 of displacing the winding assemblage 50, first and second restricting members 54a and 54b are disposed so as to come into contact with the first and second bent portions 53a and 53b, and first and second blades 55a and 55b that are produced so as to have identical shapes are disposed so as to grip each of the first and second rectilinear portions 53c and 53d.

Here, the first blades 55a grip the first rectilinear portions 53c such that positions that are shifted by a distance d1 toward the first bent portions 53a from a line segment that connects the longitudinal center points of the first rectilinear portions 53c form pivoting centers P1. Similarly, the second blades 55b grip the second rectilinear portions 53d such that positions that are shifted by a distance d1 toward the first bent portions 53a from a line segment that connects the longitudinal center points of the second rectilinear portions 53d form pivoting centers P2. Moreover, when viewed from a direction that is perpendicular to the surface of the page in FIG. 10, the pivoting centers P1 and P2 are positioned on a line segment that joins the intersecting portions of the outlet end portions 52a and 52b that are positioned at the first longitudinal end portion of the winding assemblage 50 and the intersecting portions of the outlet end portions 52c and 52d that are positioned at the second end portion. The pivoting centers P1 and P2 match longitudinally central portions of the regions of the first and second rectilinear portions 53c and 53d that are gripped by the first and second blades 55a and 55b.

Next, the first blades 55a that grip the first rectilinear portions 53c pivot counterclockwise in FIG. 11 around the pivoting centers P1, and the second blades 55b that grip the second rectilinear portions 53d pivot clockwise around the pivoting centers P2. Regions of the first and second rectilinear portions 53c and 53d that are gripped by the first and second blades 55a and 55b are displaced by this pivoting of the first and second blades 55a and 55b so as to be perpendicular to a plane that includes the pivoting centers P1 and P2. The first and second restricting members 54a and 54b are driven synchronously with this pivoting operation of the first and second blades 55a and 55b so as to narrow spacing while maintaining attitude parallel to the plane that includes the pivoting centers P1 and P2.

Each of the wires 30 is thereby formed by bending into a planar pattern that is shown in FIG. 6, i.e., a planar pattern in which slot-housed portions 30b that are linked by return portions 30a are arranged at a pitch that alternates between a pitch of seven slots (7P) and a pitch of five slots (5P).

In this step of displacing the winding assemblage 50, all of the first and second rectilinear portions 53c and 53d are displaced simultaneously to produce the winding assembly 40 that is shown in FIG. 8 (S102).

In a step S103 of producing a laminated core 39, a rectangular parallelepiped laminated core 39 is produced by laminating and integrating core segments that are punched from magnetic steel sheets (S104). As shown in FIG. 12, in the laminated core 39, teeth 39c are formed so as to be arranged at a uniform pitch on a first side of a core back 39b, and slots 39a are defined by the core back 39b and adjacent teeth 39c.

Next, in a step S105 of mounting winding assemblies 40, winding assemblies 40 are mounted into the laminated core 39 so as to be stacked in three layers in a slot depth direction by inserting the pairs of slot-housed portions 30b into each of the slots 39a.

Next, in a step S106 of bending the laminated core 39, the laminated core 39 into which the winding assemblies 40 have been mounted is rounded into an annular shape, as shown in FIG. 13. End surfaces of the rounded laminated core 39 are then abutted to each other, and are integrated by welding, etc., to produce the annular stator core 21. Next, in a step S107 of connecting the windings, the stator winding 22 is formed by connecting the end portions of each of the wires 30 based on the connection method that is shown in FIG. 3 to produce the stator 20.

In Embodiment 1, in the step of displacing the winding assemblage 50, the gripping positions of the first and second blades 55a and 55b on the first and second rectilinear portions 53c and 53d are adjusted such that line segments that connect the pivoting centers P1 and P2 are displaced by d1 toward the first bent portions 53 relative to line segments that connect the longitudinal center points of the first and second rectilinear portions 53c and 53d, respectively. Thus, the wires 30 can be bent and shaped into a pattern in which the rectilinear portions that correspond to the slot-housed portions 30b are arranged at a pitch that alternates between a pitch of five slots and a pitch of seven slots by pivoting the first and second blades 55a and 55b in opposite directions around the pivoting centers P1 and P2.

Figure 14:
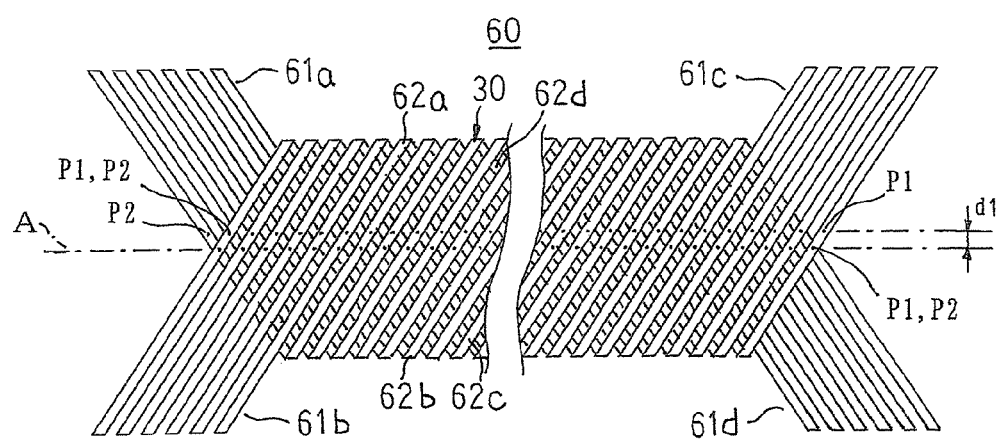
FIG. 14 is a plan that shows a comparative winding assemblage.

Next, effects that result from the winding assemblage 50 that is formed by winding twelve wires 30 being configured so as to have five each of the outlet end portions 52a and 52c and seven each of the outlet end portions 52b and 52d will be explained. FIG. 14 is a plan that shows a winding assemblage that functions as a comparative example.

First, a winding assemblage 60 that functions as a comparative example is produced by winding twelve wires 30, and has six each of outlet end portions 61a through 61d, as shown in FIG. 14. In this winding assemblage 60, ninety-six pairs of coaxial pivoting centers P1 and P2 are arranged at a uniform pitch, where the pivoting centers P1 and P2 are longitudinal center points of first and second rectilinear portions 62c and 62d. Thus, a twist forming machine that includes ninety-six pairs of first and second blades 55a and 55b (not shown) (hereinafter called a "general twist forming machine") is required to grip all of the first and second rectilinear portions 62c and 62d. The wires 30 are thereby formed into a pattern in which rectilinear portions that correspond to slot-housed portions are arranged at a pitch of six slots.

Next, a case in which line segments that connect the pivoting centers P1 and P2 in the winding assemblage 60 are shifted by d1 toward the first bent portions 62a relative to a line segment (center line A) that connects the longitudinal center points of the first and second rectilinear portions 62c and 62d will be explained. In that case, the pivoting centers P1 and the pivoting centers P2 are formed so as to be distributed on two sides of a pair group of ninety-five pairs of pivoting centers P1 and P2 that are arranged at a uniform pitch, as shown in FIG. 14. Thus, a general twist forming machine that includes ninety-six pairs of first and second blades 55a and 55b (not shown) cannot be used, and a new twist forming machine is required.

Now, in the winding assemblage 60 that is shown in FIG. 14, if one wire on a right end of the six outlet end portions 61a that are led out at an upper left end is folded over and is led out on the lower left end, and one wire on the right end of the six outlet end portions 61c that are led out to the upper right end is led out to the lower right end instead of being folded over at the second bent portion 62b, a construction that is equivalent to the winding assemblage 50 that is shown in FIG. 10 is obtained.

Thus, in the winding assemblage 60 that is shown in FIG. 14, by folding over and leading out to the lower left end one wire on the right end of the six outlet end portions 61a that are led out at the upper left end, a pair of pivoting centers P1 and P2 are formed to the left of the pair group of ninety-five pairs of pivoting centers P1 and P2 that are arranged at a uniform pitch. The pivoting center P1 that is formed to the right of the pair group of ninety-five pairs of pivoting centers P1 and P2 that are arranged at a uniform pitch is also eliminated due to one wire on the right end of the six outlet end portions 61c that are led out to the upper right end being led out to the lower right end instead of being folded over at the second bent portion 62b.

From this it can be seen that ninety-six pairs of pivoting centers P1 and P2 are arranged at a uniform pitch in the winding assemblage 50 that is shown in FIG. 10, which has five each of the outlet end portions 52a and 52c, and seven each of the outlet end portions 52b and 52d, a general twist forming machine that includes ninety-six pairs of first and second blades 55a and 55b (not shown) can be used, making it unnecessary to produce a new twist forming machine.

In this winding assemblage 60, a wave winding in which rectilinear portions are at a slot pitch that alternates between a pitch of five slots and a pitch of seven slots can be obtained by using a dedicated twist forming machine even if the line segments that connect the pivoting centers P1 and P2 are shifted by d1 toward the first bent portions 62a relative to the center line A. However, in a winding assembly that is manufactured in this manner, slot-housed portions are formed individually at two longitudinal ends of the winding assembly. Thus, when a winding assembly that is manufactured in this manner is mounted into the laminated core 39, a single slot-housed portion that is formed at a first longitudinal end of the winding assembly is not inserted into the slots 39a of the laminated core 39, but is inserted into a slot 39a into which only the single slot-housed portion is inserted after the laminated core 39 is bent into an annular shape. Consequently, the slot-housed portions that are not inserted into the slots 39a are a hindrance and the step of bending the laminated core 39 becomes complicated, and steps after the step of bending also become complicated.

In the winding assemblage 50 that is shown in FIG. 10, on the other hand, a wave winding in which rectilinear portions are at a slot pitch that alternates between a pitch of five slots and a pitch of seven slots can be obtained using a general twist forming machine by shifting the line segments that connect the pivoting centers P1 and P2 by d1 toward the first bent portions 62a relative to the center line A. In a winding assembly 40 that is configured in this manner, ninety-six pairs of slot-housed portions 30b that are stacked in the thickness direction are arranged at a pitch of one slot. Thus, all of the pairs of slot-housed portions 30b are inserted into the slots 39a of the laminated core 39 when the winding assembly 40 is mounted into the laminated core 39. Consequently, there are no problems such as slot-housed portions 39b that are not inserted into the slots 39a being a hindrance and the step of bending the laminated core 39 becoming complicated. In addition, complicated subsequent steps such as inserting a slot-housed portion 39b that is not inserted into the slots 39a into a slot 39a into which only a single slot-housed portion 30b is inserted after the laminated core 39 is bent into an annular shape are also not required.

Embodiment 2

In Embodiment 1 above, wave windings that have a slot pitch that alternates between a pitch of five slots and a pitch of seven slots are explained as being configured using single wires, but in Embodiment 2, wave windings that have a slot pitch that alternates between a pitch of four slots and a pitch of eight slots are configured using single wires.

Figure 15:
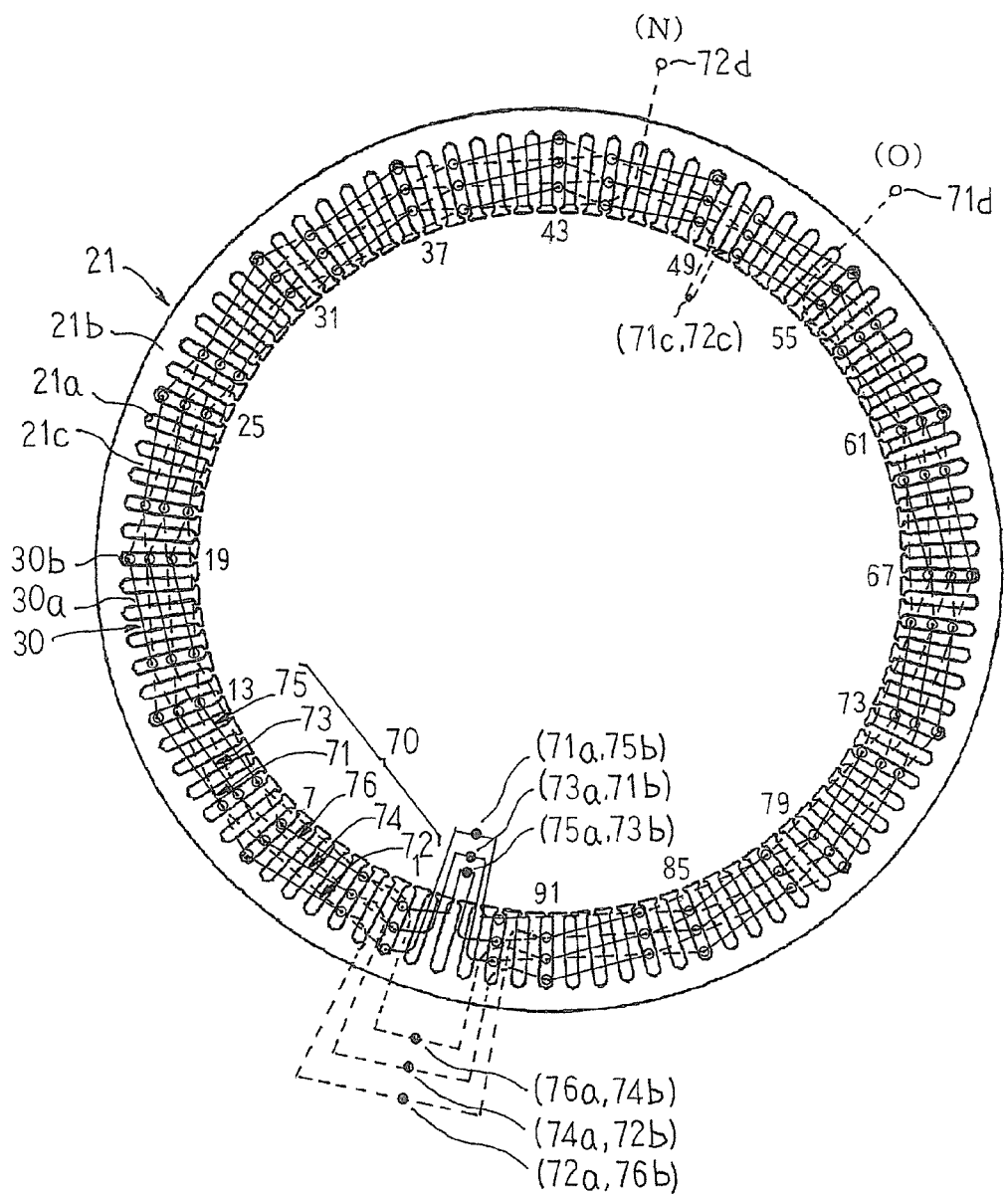
FIG. 15 is a rear-end end elevation that explains a connected state of a single phase portion of a stator winding in an automotive alternator according to Embodiment 2 of the present invention.
Figure 16:
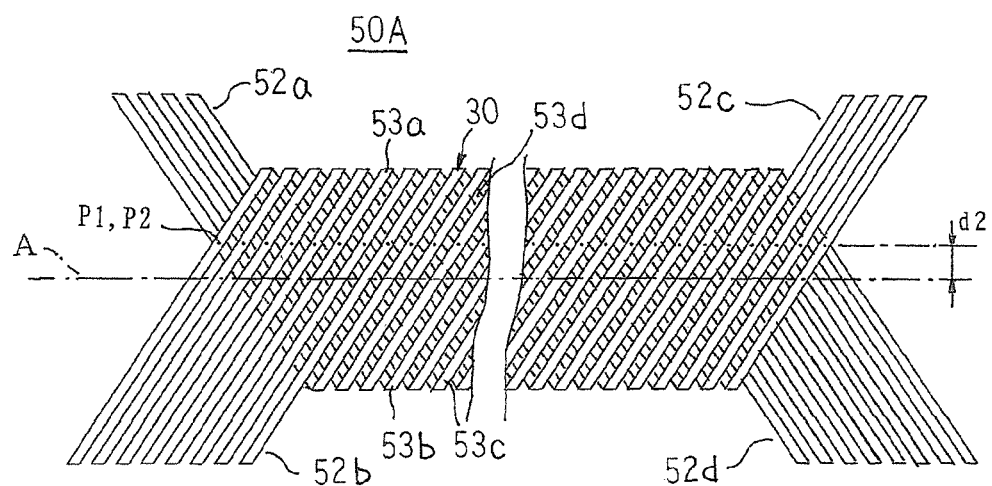
FIG. 16 is a plan that shows a winding assemblage that is produced by a step of winding wires in a manufacturing method for a stator that is used in the automotive alternator according to Embodiment 2 of the present invention.
Figure 17:
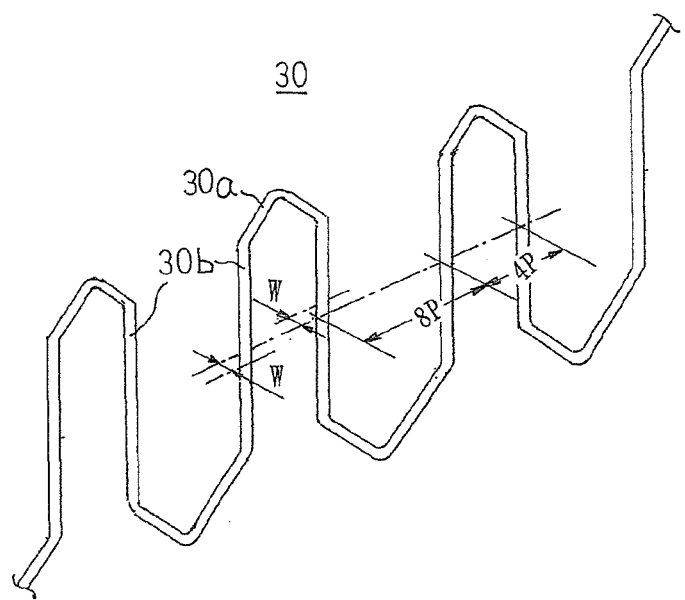
FIG. 17 is a perspective that shows a wire that constitutes a winding assembly that is produced by the step of displacing the winding assemblage in the manufacturing method for the stator that is used in the automotive alternator according to Embodiment 2 of the present invention.
Figure 18:
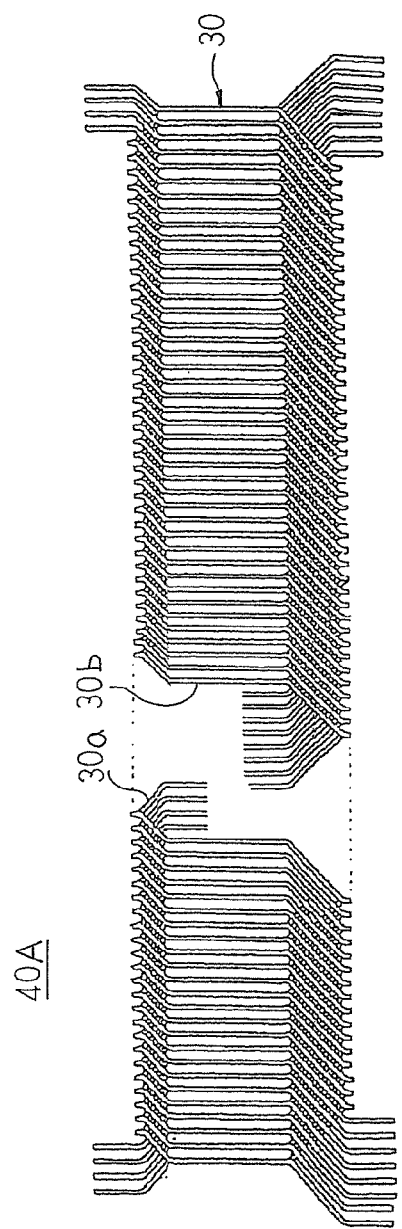
FIG. 18 is a plan that shows a winding assembly that constitutes the stator winding that is used in the automotive alternator according to Embodiment 2 of the present invention.

FIG. 15 is a rear-end end elevation that explains a connected state of a single phase portion of a stator winding in an automotive alternator according to Embodiment 2 of the present invention, FIG. 16 is a plan that shows a winding assemblage that is produced by a step of winding wires in a manufacturing method for a stator that is used in the automotive alternator according to Embodiment 2 of the present invention, FIG. 17 is a perspective that shows a wire that constitutes a winding assembly that is produced by the step of displacing the winding assemblage in the manufacturing method for the stator that is used in the automotive alternator according to Embodiment 2 of the present invention, and FIG. 18 is a plan that shows a winding assembly that constitutes the stator winding that is used in the automotive alternator according to Embodiment 2 of the present invention. In FIG. 15, solid lines represent front-end wiring, and broken lines represent rear-end wiring.

First, a winding construction of a single phase portion of the phase windings 70 will be explained in detail with reference to FIG. 15.

The phase winding 70 is constituted by first through sixth windings 71 through 76 that are each constituted by a single wire 30.

The first winding 71 is configured by winding a single wire 30 into a wave winding from Slot Numbers 1 through 93 so as to alternately occupy Address 1 and Address 2 inside the slots 21a in order of slots 21a that are eight slots apart and slots 21a that are four slots apart. The second winding 72 is configured by winding a wire 30 into a wave winding from Slot Numbers 3 through 91 so as to alternately occupy Address 2 and Address 1 inside the slots 21a in order of slots 21a that are four slots apart and slots 21a that are eight slots apart. The third winding 73 is configured by winding a single wire 30 into a wave winding from Slot Numbers 1 through 93 so as to alternately occupy Address 3 and Address 4 inside the slots 21a in order of slots 21a that are eight slots apart and slots 21a that are four slots apart. The fourth winding 74 is configured by winding a wire 30 into a wave winding from Slot Numbers 3 through 91 so as to alternately occupy Address 4 and Address 3 inside the slots 21a in order of slots 21a that are four slots apart and slots 21a that are eight slots apart. The fifth winding 75 is configured by winding a single wire 30 into a wave winding from Slot Numbers 1 through 93 so as to alternately occupy Address 5 and Address 6 inside the slots 21a in order of slots 21a that are eight slots apart and slots 21a that are four slots apart. The sixth winding 76 is configured by winding a wire 30 into a wave winding from Slot Numbers 3 through 91 so as to alternately occupy Address 6 and Address 5 inside the slots 21a in order of slots 21a that are four slots apart and slots 21a that are eight slots apart.

At a first end (a front end) of the stator core 21, an end portion 71a of the first winding 71 that projects outward from Slot Number 1 and an end portion 75b of the fifth winding 75 that projects outward from Slot Number 93 are joined together, an end portion 73a of the third winding 73 that projects outward from Slot Number 1 and an end portion 71b of the first winding 71 that projects outward from Slot Number 93 are joined together, and an end portion 75a of the fifth winding 75 that projects outward from Slot Number 1 and an end portion 73b of the third winding 73 that projects outward from Slot Number 93 are joined together to form a three-turn winding.

At a second end (a rear end) of the stator core 21, an end portion 72a of the second winding 72 that projects outward from Slot Number 3 and an end portion 76b of the sixth winding 76 that projects outward from Slot Number 91 are joined together, an end portion 74a of the fourth winding 74 that projects outward from Slot Number 3 and an end portion 72b of the second winding 72 that projects outward from Slot Number 91 are joined together, and an end portion 76a of the sixth winding 76 that projects outward from Slot Number 3 and an end portion 74b of the fourth winding 74 that projects outward from Slot Number 91 are joined together to form a three-turn winding.

In addition, a portion of the wire 30 of the second winding 72 that projects outward at the second end of the stator core 21 from Slot Numbers 43 and 51 is cut, and a portion of the wire 30 of the first winding 71 that projects outward at the second end of the stator core 21 from Slot Numbers 49 and 57 is cut. A cut end 71c of the first winding 71 and a cut end 72c of the second winding 72 are then joined together to form a six-turn phase winding 24 that is formed by connecting the first through sixth windings 71 through 76 in series. A cut end 71d of the first winding 71 and a cut end 72d of the second winding 72 respectively form an output wire (O) and a neutral point (N).

Here, the first winding 71 is configured by winding a wire 30 so as to be housed alternately in slots 21a that are eight slots apart and slots 21a that are four slots apart in Slot Numbers 1 through 93. A first winding 71 that is configured in this manner is electrically equivalent to a zigzag-connected winding in which a winding that is configured by winding a wire so as to be housed in every eighth slot 21a and a winding that is configured by winding a wire so as to be housed in every fourth slot 21a are connected in series. In other words, the first winding 71 is electrically equivalent to a zigzag-connected winding in which two windings that have a phase difference of 60 electrical degrees are connected in series.

Moreover, the second through sixth windings 72 through 76 are also electrically equivalent to zigzag-connected windings in which two windings that have a phase difference of 60 electrical degrees are connected in series, in a similar manner to that of the first winding 71.

Six phase windings 70 are formed by offsetting slots 21a into which the wires 30 are mounted in a similar or identical manner one at a time. Two three-phase alternating current windings are each configured by wye-connecting three phase windings 70 in a similar or identical manner to that of Embodiment 1 above. Output wires O that are constituted by end portions of the wye-connected phase winding 70 are connected to terminals of rectifying apparatuses 13.

Return portions 30a of the wires 30 that project outward from the slots 21a near the end surfaces of the stator core 21 and are turned over form coil ends. The return portions 30a are separated from each other in a circumferential direction, and are arranged neatly circumferentially so as to form three rows in a radial direction to form front-end and rear-end coil end groups 22f and 22r at two ends of the stator core 21. Heights from the end surfaces of the stator core 21 to top portions of return portions 30a that function as second return portions that link together slot-housed portions 30b that are housed inside the slots 21a that are eight slots apart are higher than heights from the end surfaces of the stator core 21 to top portions of return portions 30a that function as first return portions that link together slot-housed portions 30b that are housed inside the slots 21a that are four slots apart. The rear-end coil end group 22r is constituted by the return portions 30a that link together the slot-housed portions 30b that are housed inside the slots 21a that are eight slots apart.

The respective wires 30 that constitute the first, third, and fifth windings 71, 73, and 75 are wound into wave windings so as to extend outward at end surfaces of the stator core 21 from one slot 21a and be turned over and alternately enter slots 21a that are eight slots apart and slots 21a that are four slots apart. The respective wires 30 are wound so as to alternately occupy an inner layer and an outer layer in a slot depth direction (a radial direction) in every slot that alternates between the slots 21a that are eight slots apart and the slots 21a that are four slots apart.

The second, fourth, and sixth windings 72, 74, and 76 are wound into wave windings so as to extend outward at end surfaces of the stator core 21 from one slot 21a and be turned over and alternately enter slots 21a that are four slots apart and slots 21a that are eight slots apart. The respective wires 30 are wound so as to alternately occupy an inner layer and an outer layer in a slot depth direction (a radial direction) in every slot that alternates between the slots 21a that are four slots apart and the slots 21a that are eight slots apart.

Here, the stator winding is equivalent to three pairs of first winding groups and second winding groups being arranged so as to line up in a radial direction, the first winding groups being configured by arranging six first windings 71 at a pitch of one slot, and the second winding groups being configured by arranging six second windings 72 at a pitch of one slot. These pairs of first winding groups and second winding groups are provided by a winding assembly 40A that is shown in FIG. 18.

Next, a method for manufacturing the winding assembly 40A will be explained.

First, as shown in FIG. 16, a winding assemblage 50A is produced by forming outlet end portions 52a and 52b on twelve wires 30, winding the twelve wires 30 repeatedly a plurality of times simultaneously, and subsequently forming outlet end portions 52c and 52d. Moreover, the outlet end portions 52a and 52c are the end portions of four wires 30, and the outlet end portions 52b and 52d are the end portions of eight wires 30.

The first and second rectilinear portions 53c and 53d of the winding assemblage 50A that is configured in this manner are pivoted around pivoting centers P1 and P2 that are shifted toward the first bent portions 53a by a distance d2 relative to a center line A using a general twist forming machine (not shown) that has ninety-six pairs of first and second blades 55a and 55b.

Moreover, when viewed from a direction that is perpendicular to the surface of the page in FIG. 16, the pivoting centers P1 and P2 are positioned on a line segment that joins the intersecting portions of the outlet end portions 52a and 52b that are positioned at the first longitudinal end portion of the winding assemblage 50A and the intersecting portions of the outlet end portions 52c and 52d that are positioned at the second end portion. The pivoting centers P1 and P2 match longitudinally central portions of the regions of the first and second rectilinear portions 53c and 53d that are gripped by the first and second blades 55a and 55b.

Each of the wires 30 is thereby formed by bending into a planar pattern that is shown in FIG. 17, i.e., a planar pattern in which slot-housed portions 30b that are linked by return portions 30a are arranged at a pitch that alternates between a pitch of eight slots (8P) and a pitch of four slots (4P). In this step of displacing the winding assemblage 50A, all of the first and second rectilinear portions 53c and 53d are displaced simultaneously to produce the winding assembly 40A that is shown in FIG. 18.

In winding assemblies 40A that are configured in this manner, ninety-six pairs of slot-housed portions 30b that are stacked in the thickness direction are arranged at a pitch of one slot. First axial end portions of each of the slot-housed portions 30b that are positioned on a first side in the thickness direction are linked by the return portions 30a to respective first axial end portions of the slot-housed portions 30b that are positioned on a second side in the thickness direction that are separated by a pitch of four slots (4P). In addition, second axial end portions of each of the slot-housed portions 30b that are positioned on the second side in the thickness direction are linked by the return portions 30a to respective second axial end portions of the slot-housed portions 30b that are positioned on the first side in the thickness direction that are separated by a pitch of eight slots (8P).

The end portions 52a and 52c of four wires 30 project from a first side in the width direction side at each of two longitudinal ends of the winding assembly 40A, and the end portions 52b and 52d of eight wires 30 project from a second side in the width direction at each of the two longitudinal ends of the winding assemblies 40A. The return portions 30a that link the end portions of the slot-housed portions 30b that are four slots apart are arranged neatly in rows on the first side in the width direction of the winding assembly 40A, and the return portions 30a that link the end portions of the slot-housed portions 30b that are eight slots apart are arranged neatly in rows on the second side in the width direction of the winding assembly 40A.

Consequently, similar or identical effects to those in Embodiment 1 above are also exhibited in Embodiment 2.

Now, from Embodiments 1 and 2 above, it can be seen that when the number of slots that corresponds to a pitch of one magnetic pole is N, then a zigzag-connected wave winding that has a slot pitch that alternates between a slot pitch of (N−M) and a slot pitch of (N+M) can be configured using single wires 30 by a step of displacing if a winding assemblage is used that is produced by repeatedly winding (N−M)

wires 30 and (N+M) wires 30 a plurality of times simultaneously. Here, N is an integer that is greater than or equal to 2, and M is an integer that is greater than or equal to 1 and less than N. Furthermore, N is the product of the number of slots per phase per pole and the number of phases in the alternating-current winding that constitutes the stator winding.

In a winding assembly that is produced in this manner, ninety-six pairs of slot-housed portions 30b that are stacked in the thickness direction are arranged at a pitch of one slot. First axial end portions of each of the slot-housed portions 30b that are positioned on a first side in the thickness direction are linked by the return portions 30a to respective first axial end portions of the slot-housed portions 30b that are positioned on a second side in the thickness direction that are separated by a pitch of (N−M) slots. In addition, second axial end portions of each of the slot-housed portions 30b that are positioned on the second side in the thickness direction are linked by the return portions 30a to respective second axial end portions of the slot-housed portions 30b that are positioned on the first side in the thickness direction that are separated by a pitch of (N+M) slots. The end portions of (N−M) wires 30 project from a first side in the width direction side at each of two longitudinal ends of the winding assembly 40, and the end portions of (N+M) wires 30 project from a second side in the width direction at each of the two longitudinal ends of the winding assemblies 40.

Moreover, in Embodiments 1 and 2 above, a case in which the number of magnetic poles in the rotor is sixteen, the number of slots per phase per pole is two, and the stator winding is a three-phase alternating-current winding has been explained, but it goes without saying that the number of magnetic poles in the rotor, the number of slots per phase per pole, and the number of phases in the alternating-current winding of the stator winding are not limited thereto. If, for example, the number of magnetic poles in the rotor is twelve, the number of slots per phase per pole is two, and the stator winding is a three-phase alternating-current winding, then the number of slots in the stator core is seventy-two, and winding assemblies are produced using twelve wires so as to have seventy-two pairs of slot-housed portions. The end portions of (6−M) wires project from a first side in the width direction side at each of two longitudinal ends of the winding assembly 40, and the end portions of (6+M) wires project from a second side in the width direction at each of the two longitudinal ends of the winding assemblies 40. If the number of magnetic poles in the rotor is twelve, the number of slots per phase per pole is one, and the stator winding is a three-phase alternating-current winding, then the number of slots in the stator core is thirty-six, and winding assemblies are produced using six wires so as to have thirty-six pairs of slot-housed portions. The end portions of (3−M) wires project from a first side in the width direction side at each of two longitudinal ends of the winding assembly 40, and the end portions of (3+M) wires project from a second side in the width direction at each of the two longitudinal ends of the winding assemblies 40.

In Embodiments 1 and 2 above, the rectifying apparatuses, the brush holder, and the voltage regulator are disposed axially outside the rear bracket, but the rectifying apparatuses, the brush holder, and the voltage regulator may also be disposed inside the rear bracket. In that case, because the coil end height of the rear-end coil ends is also high, the length of the output wires of the stator winding that are connected to the rectifying apparatuses can be made shorter, enabling vibration resistance to be improved.

Embodiment 3

Figure 19:
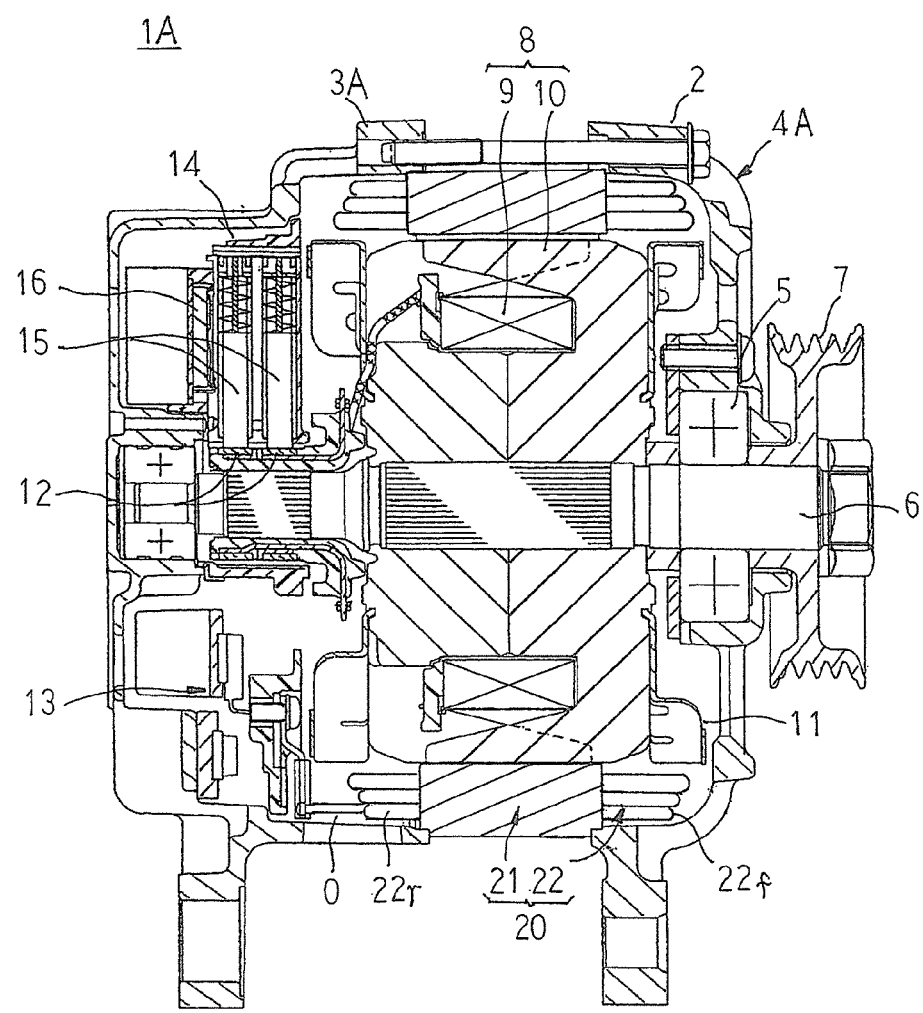
FIG. 19 is a cross section that explains a configuration of an automotive alternator according to Embodiment 3 of the present invention.

FIG. 19 is a cross section that explains a configuration of an automotive alternator according to Embodiment 3 of the present invention.

In FIG. 19, a housing 4A is constituted by a front bracket 2 and a rear bracket 3A that are each approximately bowl-shaped that are made of aluminum, and rectifying apparatuses 13, a brush holder 14, and a voltage regulator 16 are disposed inside the rear-end bracket 3A. In addition, a rear-end coil end group 22r is constituted by return portions 30a that function as first return portions that link end portions of slot-housed portions 30b that are housed in slots 21a that are five slots apart.

Moreover, the rest of the configuration is configured in a similar or identical manner to that of Embodiment 1 above.

According to Embodiment 3, a stator 20 is disposed such that a coil end group that is constituted by return portions 30a that function as first return portions that link end portions of slot-housed portions 30b that are housed in slots 21a that are five slots apart is dispose at the rear end. Thus, coil end height of the rear-end coil end group 22r is reduced, enabling the rectifying apparatuses 13, the brush holder 14, and the voltage regulator 16 to be installed inside the rear bracket 3A without enlarging the rear bracket 3A.

The stator 20 is disposed such that a coil end group that is constituted by return portions 30a that function as second return portions that link end portions of slot-housed portions 30b that are housed in slots 21a that are seven slots apart is dispose at the front end. Thus, because coil end height of the front-end coil end group 22f is increased, heat generated in the stator winding 22 is radiated efficiently to a cooling airflow that flows through the front bracket 2 by means of the front-end coil end group 22f, enabling excessive temperature increases in the stator 20 to be suppressed.

Because the rectifying apparatuses 13, the brush holder 14, and the voltage regulator 16, which are heat-generating parts, are installed inside the rear bracket 3A, ventilation resistance to the cooling airflow that flows through the front bracket 2 is reduced, increasing airflow rate, and enabling the cooling airflow that is sucked into the front bracket 2 to contribute to the cooling of the front-end coil end group 22f without being warmed by heat-generating parts. Thus, heat generated in the stator winding 22 is radiated efficiently to the cooling airflow by means of the front-end coil end group 22f.

Moreover, in Embodiment 3 above, the rectifying apparatuses, the brush holder, and the voltage regulator are disposed inside the rear bracket, but the rectifying apparatuses, the brush holder, and the voltage regulator may also be disposed axially outside the rear bracket. In that case, the heat generated in the stator winding is also radiated efficiently to the cooling airflow from the front-end coil end group that has increased coil end height, enabling excessive temperature increases in the stator to be suppressed.

In each of the above embodiments, an automotive alternator has been explained, but similar effects are also exhibited when the present invention is applied to other automotive rotary electric machines such as automotive alternating-current generator-motors or automotive alternating-current motors.

The invention claimed is:
1. An automotive rotary electric machine comprising:
a metal housing that comprises a front bracket and a rear bracket;
a rotor that is rotatably disposed inside said housing by being fixed to a shaft that is rotatably supported by said front bracket and said rear bracket; and a stator comprising:
an annular stator core in which a plurality of slots that have an opening on an inner circumferential side are disposed at a predetermined pitch circumferentially, and that is disposed so as to surround said rotor so as to be held between said front bracket and said rear bracket; and
a stator winding that is mounted into said stator core,
said automotive rotary electric machine comprising:
said stator winding is constituted by a plurality of wave windings that have a slot pitch that alternates between a slot pitch of (N−M) and a slot pitch of (N+M), where N is an integer that is greater than or equal to 2, and M is an integer that is greater than or equal to 1 and less than N;
said plurality of wave windings are constituted by at least one winding assembly that is mounted into said stator core; and
said winding assembly is produced by winding wires that are constituted by 2N continuous wires, and comprises:
slot-housed portions that are housed inside each of said slots of said stator core so as to form pairs that line up in an inner layer and an outer layer relative to a slot depth direction;
first return portions at a first axial end of said stator core that link end portions of said slot-housed portions that are housed in a first of said inner layer and said outer layer inside each of said slots and end portions of said slot-housed portions that are housed in a second of said inner layer and said outer layer inside said slots that are (N−M) slots away; and
second return portions at a second axial end of said stator core that link end portions of said slot-housed portions that are housed in said second of said inner layer and said outer layer inside each of said slots and end portions of said slot-housed portions that are housed in said first of said inner layer and said outer layer inside said slots that are (N+M) slots away,
two ends of said (N−M) wires projecting at said first axial end of said stator core, and
two ends of said (N+M) wires projecting at said second axial end of said stator core.

2. The automotive rotary electric machine according to claim 1, further comprising:
a rectifying apparatus that is disposed rearward of said rotor, and that rectifies an alternating-current voltage that is generated in said stator into a direct-current voltage; and
a voltage regulator that is disposed rearward of said rotor, and that adjusts magnitude of said alternating-current voltage that is generated in said stator,
said winding assembly being mounted into said stator core such that said second return portions are oriented toward said rear bracket.

3. The automotive rotary electric machine according to claim 2, wherein said rectifying apparatus and said voltage regulator are disposed axially outside said rear bracket.

4. The automotive rotary electric machine according to claim 1, further comprising:
a rectifying apparatus that is disposed rearward of said rotor, and that rectifies an alternating-current voltage that is generated in said stator into a direct-current voltage; and
a voltage regulator that is disposed rearward of said rotor, and that adjusts magnitude of said alternating-current voltage that is generated in said stator,
said winding assembly being mounted into said stator core such that said second return portions are oriented toward said front bracket.

5. The automotive rotary electric machine according to claim 4, wherein said rectifying apparatus and said voltage regulator are disposed inside said rear bracket.

6. An automotive rotary electric machine winding assembly manufacturing method wherein:
said winding assembly is produced by winding wires that are constituted by 2N continuous wires, where N is an integer that is greater than or equal to 2;
pairs of rectilinear slot-housed portions that are disposed parallel to each other so as to line up in a thickness direction are arranged at a pitch of one slot;
first return portions respectively link first longitudinal end portions of said slot-housed portions on first sides in a thickness direction of said pairs of said slot-housed portions and first longitudinal end portions of said slot-housed portions on second sides in said thickness direction of said pairs of straight slot-housed portions that are (N−M) slots away, where M is an integer that is greater than or equal to 1 and less than N;
second return portions respectively link second longitudinal end portions of said slot-housed portions on said second sides in said thickness direction of said pairs of said slot-housed portions and second longitudinal end portions of said slot-housed portions on first sides in said thickness direction of said pairs of straight slot-housed portions that are (N+M) slots away;
two ends of said (N−M) wires project outward near said first return portions at two ends in a direction of arrangement of said pairs of said slot-housed portions; and
two ends of said (N+M) wires project outward near said second return portions at two ends in a direction of arrangement of said pairs of said slot-housed portions,
said automotive rotary electric machine winding assembly manufacturing method comprising:
a winding step in which a winding assemblage is produced by winding said (N−M) wires and said (N+M) wires simultaneously such that:
wires that are formed into a bent shape that repeats a pattern are arranged in a direction of repetition of said pattern at a uniform pitch,
said pattern being constituted by:
a first bent portion;
a second bent portion;
a first rectilinear portion that extends obliquely from said second bent portion toward said first bent portion to link both; and
a second rectilinear portion that extends obliquely from said first bent portion toward said second bent portion to link both,
said two ends of said (N−M) wires respectively project outward near said first bent portions at two ends in a direction of arrangement of said wires; and
said two ends of said (N+M) wires respectively project outward near said second bent portions at two ends in said direction of arrangement of said wires; and
a displacing step in which each of said first rectilinear portions is gripped by a first blade and each of said second rectilinear portions is gripped by a second blade such that longitudinally central portions of regions of said first rectilinear portions that are gripped by said first blades and regions of said second rectilinear portions that are gripped by said second blades are positioned on a line segment that connects intersecting portions of said wires that are positioned at two ends in said direction of arrangement of said wires on said winding assemblage, and then said first blades and said second blades are pivoted in reverse directions to each other using said longitudinally central portions of said regions of said first rectilinear portions that are gripped by said first blades and said regions of said second rectilinear portions that are gripped by said second blades as pivoting centers to displace said gripped regions of said first rectilinear portions and said gripped regions of said second rectilinear portions so as to be parallel to each other.

* * * * *